United States Patent
Foltz et al.

[15] 3,696,662
[45] Oct. 10, 1972

[54] SAUSAGE MATURITY MEASURING DEVICE

[72] Inventors: Thomas R. Foltz, Clarendon Hills; Gerald R. Hegarty, Schiller Park; Ervin W. Hopkins, Hinsdale; Joseph C. Wilcox, Wheaton, all of Ill.

[73] Assignee: Armour and Company, Chicago, Ill.

[22] Filed: April 9, 1969

[21] Appl. No.: 814,785

[52] U.S. Cl. ..............................73/81, 73/85, 73/94, 73/141 A
[51] Int. Cl. ...........................G01n 3/48, G01n 3/08
[58] Field of Search..........73/81, 85, 83, 78, 94, 102, 73/139, 141

[56] References Cited

UNITED STATES PATENTS

| | | | |
|---|---|---|---|
| 2,466,567 | 4/1949 | Williams | 73/81 |
| 1,903,524 | 4/1933 | Webster | 73/81 |
| 2,002,495 | 5/1935 | Falk | 73/81 |
| 2,620,654 | 12/1952 | Campbell | 73/78 |
| 2,652,718 | 9/1953 | Wiseman | 73/81 X |
| 2,759,357 | 8/1956 | Bos et al. | 73/141 |
| 2,804,769 | 9/1957 | Clark | 73/81 |
| 2,975,630 | 3/1961 | Michel | 73/78 |
| 3,123,997 | 3/1964 | Cosner | 73/81 |

Primary Examiner—Richard C. Queisser
Assistant Examiner—Ellis J. Koch
Attorney—Carl C. Batz and Frank T. Barber

[57] ABSTRACT

Moveable elements having jaws are connected in plier form, one of the jaws having a hemispherical projection, and one of the elements communicating with a force measuring gauge. A sausage can be gripped between the jaws and the force required to impress the hemispherical projection into the sausage can be read on the gauge as a measurement of the maturity of the sausage.

6 Claims, 8 Drawing Figures

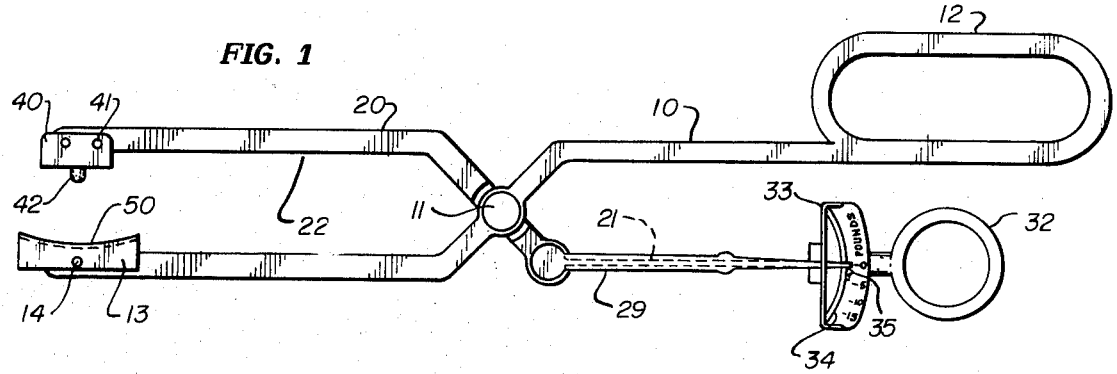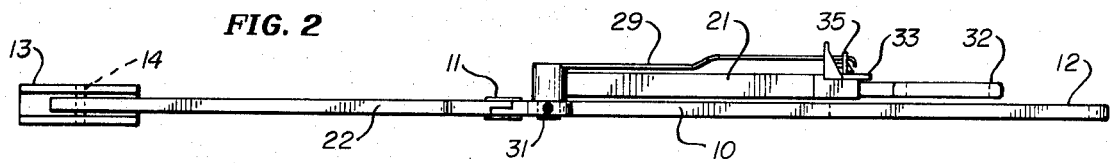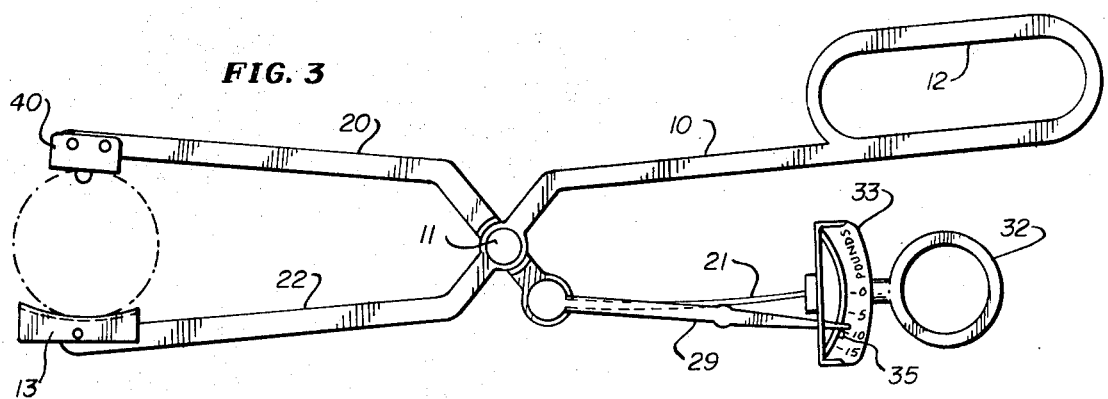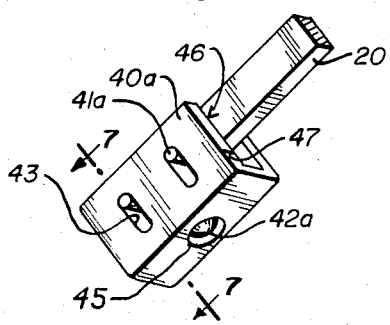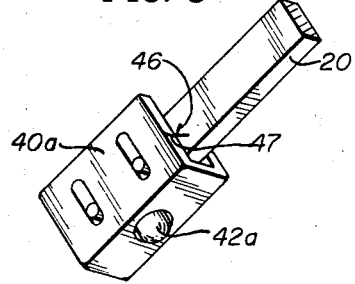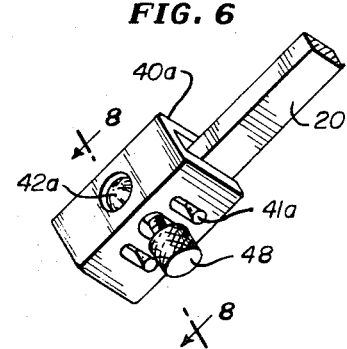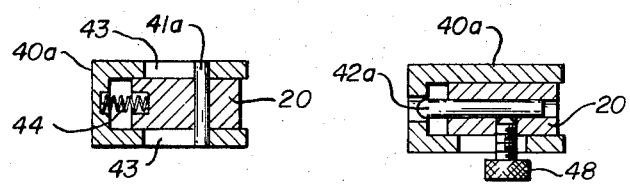

3,696,662

SAUSAGE MATURITY MEASURING DEVICE

BACKGROUND OF THE INVENTION

The term "sausage" today encompasses a wide variety of different types of sausage possessing very different characteristics. It is generally acceptable in the trade to classify sausage as fresh, cooked or smoked, and dry. The dry sausages may be further classified as new sausage, medium dry sausage, and fully dried sausage in order of increasing drying time and degree of dryness.

Dry sausage may also be smoked. It is preserved largely through the drying step itself, although the keeping qualities of dry sausage are also generally attributable to a low pH, high salt content, curing salts and spices in conjunction with the low moisture content. The length of time that any particular sausage is dried varies in the trade and depends primarily on the specific type of sausage being produced. Generally drying periods are from about 2 to 90 days. When the sausage reaches the desired point of dryness, it is said to have matured.

As the sausage matures, it attains a characteristic hardness which corresponds to its degree of dryness, that is, the drier the sausage the harder it becomes. The determination of when a particular sausage has matured is made by testing the hardness of the sausage. Heretofore this determination has generally been made by squeezing the sausage between the thumb and forefinger of one hand to estimate the hardness. It will be immediately appreciated that such a method is imperfect at best, and that to gauge the maturity of sausage by this method with any degree of accuracy requires considerably experience and a great deal of judgment. Clearly a more accurate method of testing sausage maturity is desirable to attain the degree of quality control necessary in modern competitive industry.

SUMMARY OF THE INVENTION

It is an object of the present invention therefore to provide a mechanical device for measuring the maturity of sausage.

It is a further object of the invention to provide a device for measuring the maturity of sausage in which the measurements will remain consistent from one operator to another.

A still further object of the invention is to provide a device and method for determining the maturity of sausage which can be performed with a minimum of training and experience.

Further objects of the invention will in part be suggested and in part become obvious as the specification proceeds.

The present invention comprises a device and method for measuring the maturity of sausage. The device may generally comprise a pair of moveably connected elements having jaws adapted to grip a sausage therebetween, one of the jaw portions having an indenting means to be impressed into the sausage. A force indicating gauge is operably mounted on one element and calibrated to measure the force necessary to impress the indenting means into a sausage.

BRIEF DESCRIPTION OF THE DRAWING

FIG. 1 is a plan view of one embodiment of the device,

FIG. 2 is a front view in elevation of the same embodiment,

FIG. 3 is a plan view of the embodiment shown in FIG. 1 depicting the device in operation, FIG. 4 is a partial perspective view of another embodiment of the device with the hemispherical indenting portion fully retracted, FIG. 5 is a partial perspective view as in FIG. 4 showing the hemispherical indenting portion partially extended, FIG. 6 is a partial perspective view of the embodiment shown in FIGS. 4 and 5 showing the positioning of an adjustable setscrew, FIG. 7 is a partial section view taken along line 7—7 in FIG. 4, FIG. 8 is a partial section view taken along line 8—8 in FIG. 6.

DESCRIPTION OF THE PREFERRED EMBODIMENTS

Referring to the drawings, it can be seen that the present device may generally comprise a pair of tongs made up of arms 10 and 20, which are pivotally connected by a suitable connecting pin 11. One end of arm 10 is formed into a hand grip means 12, such as a looped handle. The opposite end of tong arm 10 terminates at jaw portion 13 which may have a concave innerface 50. Jaw portion 13 is pivotally mounted to arm 10 by connecting pin 14. Through the provision of a jaw portion which is concave at its innerface and free to pivot about pin 14, jaw portion 13 is adapted to receive and accommodate sausages of various diameters. It will be understood that this configuration is preferred and that the invention encompasses a rigid supportive means, as well as a jaw portion with an innerface of flat or other suitable configuration.

Tong arm 20 is preferably comprised of a force-indicating gauge portion 21 and an operating portion 22. Gauge portion 21 and operating portion 22 are securely fastened together by means of pin 31. The construction of gauge portion 21 is of particular significance. As can be seen in FIGS. 1 through 3, gauge portion 21 is preferably a flat strip of flexible metal having its width oriented in a vertical plane. In this orientation, the metal strip is substantially rigid in the vertical plane and flexible in the horizontal plane. Thus it can be seen in this construction that if a hard object is placed between jaw portion 13 and jaw member 40 and tong arms 10 and 20 are rotated to apply a squeezing force to the object, gauge portion 21 will tend to flex and be displaced inwardly in response to the resistance offered by the object, as illustrated in FIG. 3.

Gauge portion 21 terminates in a finger grip means 32 preferably in the form of a closed loop. Adjacent grip means 32 is an arcuate scale 35 having incremental markings thereon from which force readings can be taken. Preferably the scale has a slotted keyway 34 in which a corresponding key 35 on the tip of force indicator 29 can be slidably moved. The scale increments may be calibrated to correspond to the resistance to rotation offered by coil spring 44.

Operating portion 22 terminates in jaw member 40 which may be secured to arm 20 by means of pins 41. Jaw 40 has a hemispherical projection 42 protruding from the interior face of the jaw. This entire jaw structure may be rigid, as shown in FIG. 1 or it may be moveable as shown in the embodiment in FIGS. 4 through 8. With particular reference to those figures the construction of the jaw portion will be explained in more detail. In that embodiment jaw portion 40a is slidably fastened to tong arm 20 by means of pins 41a projecting through slots 43. Jaw 40a is held away from tong arm 20 by means of springs 44 shown best in FIG. 7. As pressure is applied to the interior face of jaw 40a the springs 44 are compressed and the interior face of the jaw portion moves closer to tong arm 20 thereby allowing hemispherical projection 42a to be exposed through the aperture 45 in the interior face of jaw portion 40a. The displacement of jaw portion 40a can be continually reproduced by the provision of index marks 46 and 47 on tong arm 20 and jaw portion 40a respectively. When the index marks are aligned as in FIG. 5 the hemispherical projection 42a will protrude a preset distance from the interior face of jaw member 40a. The distance which the hemispherical projection protrudes away from the interior face can be adjusted by means of setscrew 48. While the function of the various adjustments available to jaw member 40a will be explained in more detail hereinafter, it should be seen at this point that essentially these adjustments provide for a greater or lesser penetration of hemispherical projection 42a into a sausage to be tested. Moreover the index marks 46 and 47 provide a reference point at which readings can be taken thereby providing for consistent readings by different operators.

OPERATION

In the operation of the present device a sausage to be tested is placed between the opposing jaws 13 and 40. Grip means 12 and 32 are squeezed together causing tong arms 10 and 20 to pivot about connecting pin 11 bringing the opposing jaws 40 and 13 closer together. As the hemispherical projection 42 contacts the sausage wall, the opposite side of the sausage being supported by the concave face of jaw portion 13, the resistance of the sausage wall is transmitted to tong arm 10 and gauge portion 21. The application of a further squeezing force to the grip means 32 will then result in a flexing of gauge portion 21. As this flexible displacement takes place scale 33 will be pivoted inwardly causing the fixed force indicator 29 to indicate the deflection on the scale. This process will continue until such time as the force applied through grip portion 32 overcomes the resistance of the sausage to hemispherical projection 42. At that time hemispherical projection 42 will be indented into the sausage bringing the interior face of jaw portion 40 into contact with the sausage wall. At that point the operator may note the reading on scale 33 and by comparing the reading to an established standard can determine whether or not that particular sausage has achieved the desired degree of dryness and hardness. The force on grip means 32 can then be released, at which time gauge portion 21 will return to a neutral or zero position. Grip means 32 and 12 may then be spread apart in order to withdraw hemispherical projection 42 from the sausage and the sausage may then be removed from engagement with the device.

We discovered that when using the embodiment of the device wherein hemispherical projection 42 is rigidly fixed to jaw member 40, it was possible to get some variation of reading for the same sausage from one operator to another. It is believed that these variations may be due to the rate at which the squeeze force is applied, and the possibility that the operator may continue to apply force even though the hemispherical projection 42 has fully penetrated the sausage. Therefore it may be preferred to use the embodiment shown in FIGS. 4 through 8 wherein the jaw member 40a may be adjusted to compensate for these variables.

In operation the hemispherical projection 42a may be pre-set to any desired depth of penetration by means of setscrew 48. Once that depth has been set the device is placed on a sausage to be tested with the concave innerface of jaw portion 13 in contact with one side of the sausage and the innerface of jaw member 40a in contact with the opposite side of the sausage. At that time, hemispherical projection 42a will be in the recessed position within aperture 45 and the index mark 47 will be displaced inwardly from index mark 46. As a squeezing pressure is applied to grip means 12 and 32 tong arm 20 is urged toward the sausage compressing springs 44 and causing hemispherical projection 42 to protrude from aperture 45. As the hemispherical projection 42a attempts to penetrate the sausage, the resisting force thus created causes gauge portion 21 to flex displacing the scale 33 inwardly in an amount indicated by force indicator 29. The squeezing force is continually applied until hemispherical projection 42a has penetrated the sausage to a depth sufficient to bring index mark 46 directly in line with index mark 47 as shown in FIG. 5. At precisely this point the deflection of scale 33 is read which may then be compared with an established standard. It can be seen that by the use of this moveable jaw member 40a and the index marks 46 and 47, the deflection of scale 33 can be read at the same point by different operators merely by first aligning index marks 46 and 47 and taking their reading at that point. In this manner the readings taken by different operators are made more consistent. It will be appreciated that because of the wide variety of sausages in production and the potentially wide range of hardness which might therefore be desireable to be measured, it would be necessary to provide a device with a comparatively large scale which would be capable of making measurements on reasonably soft sausages and on those that are reasonably hard. However the addition of setscrew 48 allowing the hemispherical projection 42a to be adjusted allows for the use of a smaller scale while retaining the capability of the device to measure sausages throughout a wide range of hardness. In this manner the device can be pre-set so that the index marks 46 and 47 will be aligned with only a slight penetration of hemispherical projection 42a, or it may be set so that a fairly deep penetration of hemispherical projection 42a is necessary before the index marks become aligned. The adjustments to setscrew 48 can then be made as the operator goes from one particular variety of sausage to another.

It can be seen that the device is capable of rendering readings which are far more accurate than those which can be obtained merely through the "feel" of the thumb and forefinger. The particular sausage manufacturer can then set up precise standards in terms of the scale readings of the device itself for each of his varieties of dry sausage. These readings then will remain constant from one operator to another, and is is not necessary to have an operator with a great deal of experience in order to obtain accurate readings.

While in the foregoing specification the details of construction of the device and its operation have been set out in considerable detail, it will be understood that these can be varied widely by those skilled in the art without departing from the spirit or scope of the invention which is defined in the appended claims.

We claim:

1. A device for measuring the maturity of a sausage comprising a pair of arms pivotally connected in pliers form having handles and opposing tong members, one of said tong members having associated therewith a jaw portion which is yieldable when pressed against a sausage to move toward said one tong member, said portion having an aperture in the interior face thereof, indenting means secured to said one tong member and which projects through said apertured jaw portion upon yielding movement of said jaw portion, indexing means for indicating the extent to which said portion has yielded to move toward said tong member when pressed against a sausage so as to indicate the extent of indenture of said indenting means into the sausage, and means for measuring the force to impress said indenting means into the sausage.

2. A device as set forth in claim 1 including gauge means connected to one of said arms for measuring the force required to impress said indenting means to a predetermined extent as indicated by said indexing means.

3. A device as set forth in claim 2 wherein said gauge means includes a yieldable arm which forms one of said handles.

4. A device as set forth in claim 1 wherein said indenting means is hemispherically shaped.

5. A device as set forth in claim 1 including means for adjusting the distance said indenting means may project from the interior face of said jaw portion.

6. A device as set forth in claim 3 which includes force indicator means which cooperates with said yieldable arm for indicating the extent to which said yieldable arm has yielded.

* * * * *